United States Patent [19]

Foa' et al.

[11] Patent Number: 5,300,583
[45] Date of Patent: Apr. 5, 1994

[54] POLYMER COMPOUNDS CONTAINING STERICALLY HINDERED AMINO GROUPS, SUITABLE TO BE USED AS STABILIZERS AND POLYMER COMPOSITIONS COMPRISING THEM

[75] Inventors: Marco Foa'; Francesco Casagrande, both of Novara; Umberto Giannini, Milan; Giancarlo Caselli, Ferrara, all of Italy

[73] Assignee: Himont Incorporated, Wilmington, Del.

[21] Appl. No.: 899,790

[22] Filed: Jun. 17, 1992

[30] Foreign Application Priority Data

Jun. 17, 1991 [IT] Italy .................. MI91A001659

[51] Int. Cl.$^5$ .................................. C08F 8/32
[52] U.S. Cl. ........................ 525/333.2; 525/279; 525/298; 525/327.9; 525/331.7; 525/332.9; 525/333.3; 525/374; 525/375; 525/379
[58] Field of Search ............... 525/333.2, 374, 379, 525/327.9, 279

[56] References Cited

U.S. PATENT DOCUMENTS

| | | | |
|---|---|---|---|
| 3,705,166 | 12/1972 | Murayama | 524/99 |
| 4,413,076 | 11/1983 | Soma et al. | 524/102 |
| 4,413,093 | 11/1983 | Loffelman et al. | 525/185 |
| 4,435,555 | 3/1984 | Loffelman et al. | 526/261 |
| 4,520,171 | 5/1985 | Diveley | 525/279 |
| 4,797,451 | 1/1989 | Roggero et al. | 525/332.9 |

FOREIGN PATENT DOCUMENTS

| | | | |
|---|---|---|---|
| 0001803 | 5/1979 | European Pat. Off. | C08F 2034 |
| 0303281 | 2/1989 | European Pat. Off. | C08F 8/30 |
| 0303987 | 2/1989 | European Pat. Off. | C08F 8/30 |

*Primary Examiner*—Fred Zitomer

[57] ABSTRACT

Polymer compounds containing sterically hindered amino groups of a specific general formula, which can be prepared from polymers having at least one aldeyde or ketone group per chain.

8 Claims, No Drawings

POLYMER COMPOUNDS CONTAINING STERICALLY HINDERED AMINO GROUPS, SUITABLE TO BE USED AS STABILIZERS AND POLYMER COMPOSITIONS COMPRISING THEM

The present invention relates to a new class of polymer compounds, containing sterically hindered amino groups, capable of acting as stabilizers of organic materials, such as polymers for example, and polymer compositions comprising them.

It is well known that polymer substances such as polyolefins have a tendency to degrade rapidly once they are exposed to air or oxidizing agents and light in general. Said degradation, which brings to a deterioration of their physical characteristics, such as their mechanical properties and color, increases by being exposed to solar light or other sources of UV radiations.

Light stabilizers are used in order to counteract this phenomenon.

Various classes of compounds that act as light stabilizers are known in the art, and one of them is represented by compounds containing sterically hindered amino groups ("HALS": hindered amine light stabilizers), where the group, which is considered active in the stabilization, is a polyalkyl substituted piperidine group.

Some of these compounds are described in published European patent application EP 176 106 and U.S. Pat. No. 4,056,507. An example of said HALS is the compound marketed by Ciba Geigy under the Tinuvin 770 trade mark, which is widely used in the industry, especially as light stabilizer in the field of molded polymer products destined for the automotive industry.

However, some of the compounds found within said class have not proven to be very effective, and, therefore, they are not very interesting from a practical point of view. One of the reasons for said low effectiveness is volatility, since this causes a loss of stabilizers during the high temperatures processes to which the polymer is subjected during the various manufacturing steps.

Another cause is poor compatibility with the matrix of the polymer to be stabilized, due to different structural characteristics for example, thus causing the "blooming" phenomenon, i.e., the migration of the stabilizer on the surface with the consequent loss of same and the deterioration of the aesthetic characteristics of the articles.

Polymeric HALS have been synthetized in order to solve the volatility problem. Said HALS have been obtained by polycondensation between diamines or diols containing the substituted polyalkyl piperidine group and bifunctional organic compounds, such as dihalogen derivatives or bicarboxilic acid diesters for example. Examples of this class of HALS are the following commercially available compounds: Chimassorb 944, Tinuvin 622, Spinuvex A 36, marketed by Ciba Geigy, and Cyasorb UV 3346 marketed by American Cyanamid. However, said compounds have the disadvantage, at least in some cases, of giving poor results from a stabilization point of view also because of their poor compatibility with the matrix of the polymer to be stabilized. These HALS are used mainly in the stabilization of polymer films and fibers.

Polymer HALS have also been obtained by way of polymerization or co-polymerization of derivatives of polyalkyl piperidine, containing double bonds, in the presence of radical initiators. Examples of said class of compounds are given in U.S. Pat. Nos. 4,487,887; 4,404,301; 4,499,220; 4,487,900; 4,294,949 and 4,435,555. These polymer HALS, especially when their molecular weight is high, are not very compatible with the matrix of the polymer to be stabilized, disperse unevenly in it, and therefore their effectiveness is poor.

Likewise, the polymers obtained by incorporating the polyalkyl piperidine group in particular polymers, such as polyurethanes (see German published patent application 2,719,132), polyethers (see U.S. Pat. No. 3,974,127), polyether esters (see U.S. Pat. No. 4,136,090), polyesters (see U.S. Pat. No. 4,413,076), polyphosphazenes (see U.S. Pat. No. 4,451,400) and polysiloxanes (see published European patent applications EP 263 561 and 343 717) are also not very compatible and, therefore, hardly effective.

Another class of polymeric HALS is represented by the compounds where the group containing the polyalkyl piperidine is bonded to a polyolefin matrix; the synthesis reaction of said compounds includes basically two reaction steps, i.e., the grafting of unsaturated compounds, such as for example epoxypropyl methacrylate or maleic anhydride, on said polyolefin, and the subsequent reaction of said grafted polymer with appropriate derivatives of polyalkyl piperidine (see Angew. Makromol. Chemie 1989 171 page 153, U.S. Pat. No. 4,520,171 and the published European patent petitions EP 303 281 and 303 987). However, said compounds present some disadvantages connected with the synthesis technique. In fact, the process of grafting reactive unsaturated molecules is somewhat critical, since some particular phases, such as eliminating the nonreacted unsaturated compound or its homopolymer present as a by-product of the reaction, are difficult to control. Moreover, it is difficult to obtain a homogeneous distribution of the grafted groups on the polymer matrix.

The Applicant has now found a new class of HALS, very effective in the light stabilization, easy to prepare starting from commercial products, and can be used just as successfully in the polymer film and fiber sector as in the molded article field, such as products destined for the automotive industry, for example.

Object of the present invention are, in particular, polymer compounds containing sterically hindered amino groups, which are suitable to be used as stabilizers, of the general formula:

P(ZA)$_n$ where:
P is a polymer chain deriving essentially from a polymer selected from polymers or copolymers of olefins having a double bond in the end position, and 2 to 10 carbon atoms, or polymers of conjugated diolefins with 4 or 5 carbon atoms, or their copolymers with the olefins specified above;
n is a number from 1 to 20, preferably from 1 to 10;
the ZA groups, equal or different, directly bonded to the polymer chain, can be present in the end position, inserted in the polymer chain or one of its branches, and are selected from the group comprising the following formulas:

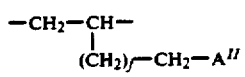

-continued

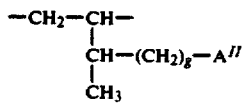

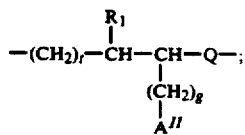

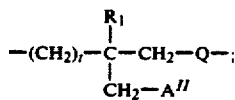

where:

f is 1 or 2;

g is 0 or 1;

t is 0 or 1;

$R_1$ is selected from H or a $C_1$-$C_8$ alkyl or phenyl radical, preferably $R_1$ is H, $CH_3$, $C_2H_5$;

Q can be H or —$(CH_2)_t$— depending on whether the ZA group is terminal, inside the chain, or lateral; and $A^{II}$ is a radical containing the structure of a polyalkyl piperidine, preferably the structure of the 2,2,6,6-tetramethylpiperidine, always bonded to the carbon of the polymer chain through an N atom, preferably through an amine or hydrazine group;

e) 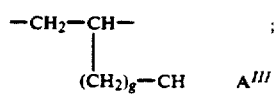

f) 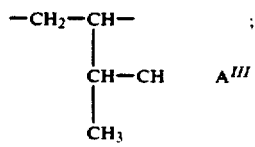

g) 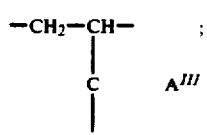

h) 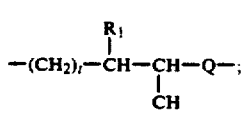

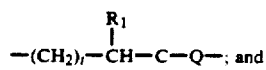

-continued l) 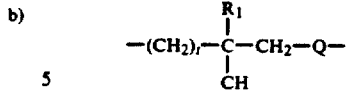

where: $A^{III}$ is a bivalent radical, containing the structure of a polyalkyl piperidine, preferably of the 2,2,6,6-tetramethylpiperidine, and forms a cyclic structure with the carbon atom of the polymer chain to which it is bonded, since it is bonded to this carbon through two N or O atoms, or $A^{III}$ forms a double bond with the carbon atoms of the polymer chain to which it is bonded.

$A^{II}$ is selected from:

1) 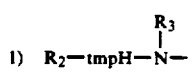

where:

$R_2$ is selected from H, the $CH_2$—CN radical, a $C_1$-$C_{12}$ alkyl radical, $C_3$-$C_{12}$ alkene, acyl radical of CO—$R_2'$, where $R_2'$ is a $C_1$-$C_{12}$ alkyl radical, or a $C_7$-$C_{12}$ aralkyl radical optionally substituted with alkyl or alkoxy groups;

$R_3$ can be H, a $C_1$-$C_{18}$ alkyl radical, $C_5$-$C_8$ cycloalkyl radical, $C_2$-$C_{12}$ alkoxyalkyl, dialkylamine alkyl having up to 10 atoms of carbon, or the —tmpH—$R_2$; tmpH represents the group

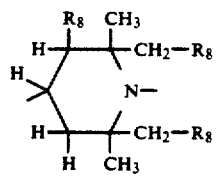

where $R_2$ in always bonded to the piperidine nitrogen atom; $R_8$=H or $CH_3$, preferably H 2) 

where: B is selected from O and $NR_3$; p is an integer from 1 to 4;

3) 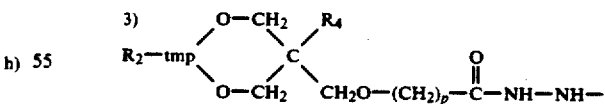

where $R_4$ is a $C_1$-$C_6$ alkyl radical, and tmp represents the group:

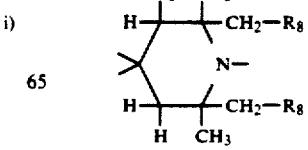

4) 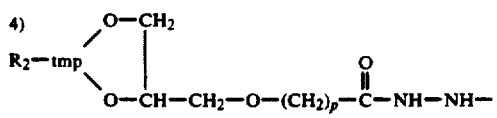

5) 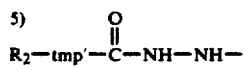

tmp' has the structure

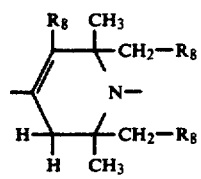

with $R_2$ always bonded to the piperidine nitrogen atom;

6) a triazine type structure of the formula:

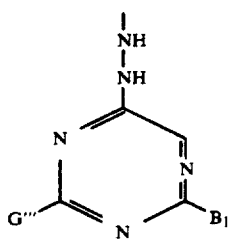

where $G'''$ is selected from the (1) structure or the following structures:

1a) $R_2-tmpH-O-$,

2a) 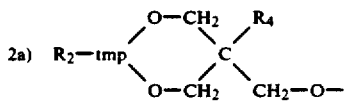

where $R_4$ is a $C_1-C_6$ alkyl radical,

3a) 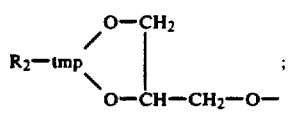

$B_1$ has the same meaning as $G'''$, or is a $D-R_5$, where D is selected from O, S, NH, $NR_7$, $R_7$ is H, a $C_1-C_3$ alkyl, a benzyl, or allyl radical, a $(CO)R_9$ radical, where $R_9$ is a $C_1-C_6$ alkyl, $C_2-C_6$ alkenyl, $C_2-C_6$ alkynyl, $C_6-C_{10}$ aryl, $C_7-C_{13}$ aralkyl radical, or a $Si(R'_9)_3$ radical where $R'_9$ is a $C_1-C_4$ alkyl or a phenyl radical, preferably $R_7$ is H and where $R_5$ is a $C_1-C_{20}$ alkyl radical, $C_5-C_8$ cycloalkyl radical, $C_7-C_{12}$ aralkyl radical, or $C_6-C_{12}$ aryl radical.

Preferably the $A^{II}$ is selected from the (1) and (6) structures.

When it forms a cyclic structure with the carbon atom of the polymer chain to which it is bonded, the $A^{III}$ is selected from:

7) 

where i is 2 or 3;

8) 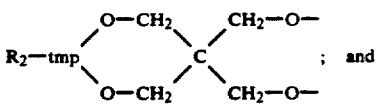

9) 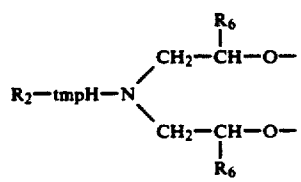

where $R_6$ is H or $CH_3$.

In this case the preferred structure for the $A^{III}$ is (7). When it forms a double bond with the carbon atom to which it is bonded, $A_{III}$ has the following structure:

10) 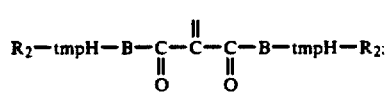

Preferably the polymer chain (P) derives from polyethylene, polypropylene, polybutene, polybutadiene, or their copolymers, and has a molecular weight from 200 to 10,000, more preferably from 300 to 5,000.

Z generally indicates a group deriving from the reaction of a functional Z' group, present on the polymer chain in the end position, inside the chain or in one of its branches, where the compound contains the substituted polyalkyl piperidine group ($A^{II}H$ or $A^{III}H_2$). In the case of the present invention, Z' is an aldehyde or ketone group and Z assumes different meanings depending on the nature of $A^{II}H$ and $A^{III}H_2$ and on the position that the Z' occupies in the polymer chain.

Examples of compounds of formula $A^{II}H$ and $A^{III}H_2$ are: 4-amino-2,2,6,6-tetramethylpiperidine, N,N'-bis(2,2,6,6,-tetramethyl-4 piperidinyl)ethylene diamine, respectively.

The compounds object of the present invention can be prepared starting from polymers or copolymers of olefins, or polymers of diolefins, or their copolymers with the monoolefins (described in more details in the definition of P) containing at least an aldehyde or ketone group in the chain.

These polymers containing at least one ketone or aldehyde group are available commercially or can be prepared by known methods, such as for example by the hydroformylation reaction of the corresponding polymers having at least one double bond, or by the isomerization reaction of an epoxy group present in the polymer chain.

The polymers having at least one double bond which can be used as starting materials, can be represented by the following formula:

$$R^{IV}-[X_a-Y_b]_{n1}-R' \qquad (III)$$

where $X_a$ represents the group

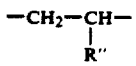

and $Y_b$ represent the group

where:
t is an integer from 0 to 1,
a is an integer from 0 to 300,
b is an integer from 0 to 180,
n1 is an integer from 1 to 180, provided that $a+b \geq 1$ and $a+b+n1 \geq 10$,
$R^{IV}$ is selected from H or a $C_1$–$C_{15}$ hydrocarbon radical,
R', equal or different from $R^{IV}$, has the same meaning as $R^{IV}$ and
$R^{II}$ is selected from H, or a $C_1$–$C_8$ hydrocarbon radical, phenyl or vinyl radical, with the proviso that if R" is H or a hydrocarbon radical, b is $\geq 1$.

The hydroformylation reaction, which brings only to compounds containing an aldehyde group, can be carried out following what is indicated in "Ind. Eng. Chem. Research (1990) 29 page 1443" and can be shematized as follows:

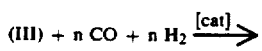

where:
a', a2, b' and b2 are integers which satisfy the relations $a'+a2=a$, and $b'+b2=b$, respectively, provided that $a'+b' \geq 1$;
$X_1$ represents a group selected from:

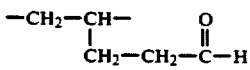

and

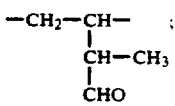

$Y_1$ represents a group selected from:

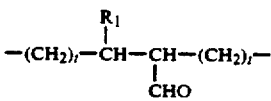

and

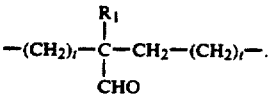

The isomerization reaction of the epoxide group can be carried out following one of the methods described in "R. Larok Comprehensive Organic Transformation, page 628". The preferred method is, however, the one that describes how to treat the compound containing the epoxide group with $BD_3.Et_2O$ in solution of a hydrocarbon solvent at ambient temperature.

If this isomerization reaction is not carried out in a quantitative manner, some epoxide groups can remain on the polymer chains; in this case, the compound containing the substituted polyalkyl piperidine group will attack both the carbonyl groups present on the chain and the epoxide groups that have remained. Therefore, the compounds object of the present invention will contain both the ZA groups which have been previously specified and the other groups which derive from the reaction of the epoxide groups which remained in the chain and described in the copending Italian patent application, filed on Jun. 17, 1991, in the name of the Applicant.

The addition reaction of the derivatives containing the substituted polyalkyl piperidine on the aldehyde or ketone group present in the polymer chain occurs, for example, by way of a reducing ammination reaction, as described in March, "Advanced Organic Chemistry", Second Edition, 819 (1977) McGraw-Hill (New York).

This reaction takes place in two stages: the first one is characterized by the attack of the compound containing the substituted piperidine polyalkyl group ($A^{II}H$ or $A^{III}H_2$), the second one by the hydrogenation or hydrogenolysis (only the hydrogenolysis can take place when the compound containing the substituted polyalkyl piperidine group is a secondary amine).

The intermediate compound is not usually isolated, but the solvent can be changed, when necessary, between the first and second step.

The compound containing the substituted polyalkyl piperidine group is added at least in a stoichiometric amount with respect to the carbonyl groups present in the polymer chain.

The first step of the reaction is carried out preferably in an aliphatic or aromatic hydrocarbon solvent.

If the compound containing the substituted polyalkyl piperidine group contains primary amino groups, the azeotropic distillation of the water that forms during the reaction is carried out simultaneously in this first step. In this case the temperature preferably ranges from 80° to 140° C. The reaction is run until the carbonyl group disappears completely, following the reaction by way of the IR spectroscopy.

If the compound containing the substituted polyalkyl piperidine group contains a secondary amino group, one can operate in the presence of compounds capable of promoting the reaction, such as the $TiCl_4$ for example, preferably at a temperature of 20° to 50° C.

Once this first step is completed, the solvent is changed, when necessary, and the reducing substance is added.

In this second step alcoholic type solvents can be used; they are the preferred ones when used as $NaBH_4$, or $H_2$ reducing substances in the presence of Pt or Pd.

In this second stage the preferred temperatures are those ranging from 20° to 50° C.

If the compound containing the substituted polyalkyl piperidine group contains two functional groups capable of attacking the carbonyl group present on the polymer chain (two amino groups for example), that is to say that it belongs to the $A^{III}H_2$ type, $A^{III}$ can form a cyclic structure with the carbon atom of the chain to which it is bonded. If the desired product is the one where $A^{III}$ forms a double bond with the polymer chain to which it is bonded, the reaction occurs preferably in a hydrocarbon solvent at a temperature ranging from 70° to 140° C., optionally in the presence of a base, such as for example piperidine (see "organic Reactions" 15, page 204, (1967)); as an alternative, the reaction can be carried out following the system of TiCl$_4$-piperidine in tetrahydrofurane (see "Tetrahedron", 28, page 663, (1972)).

Small quantities of the compounds which are the object of the present invention are used in order to provide light stabilization.

The quantity of said compounds which can be used to obtain the light stabilizing effect is usually from 0.01 to 3 parts by weight per 100 parts by weight of the material to be stabilized.

In particular, object of the present invention are also the polymer compositions containing the compounds of formula P(ZA)$_n$ in quantities from 0.01 to 3 parts by weight per 100 parts of polymer material to be stabilized.

The polymers for which the compounds of formula P(ZA)$_n$ have been particularly effective as light stabilizers include: polymers and copolymers, or their mixtures obtained by way of sequential polymerization of olefins of formula: R'''—CH=CH$_2$, where R''' is a hydrogen atom, or a 1-6 carbon atoms alkyl or aryl radical.

In particular, said polymers and copolymers comprise:
1) isotactic or mostly isotactic polypropylene;
2) HDPE, LLDPE and LDPE polyethylene;
3) crystalline copolymers of propylene with ethylene and/or other α-olefins, such as for example 1-butene, 1-hexene, 1-octene, and 4-methyl-1-pentene;
4) elastomeric ethylene/α-olefine/copolymers, and ethylene/α-olefin/diene terpolymers containing minor portions of diene, where the α-olefin is preferably selected from propylene, 1-butene, 1-pentene, 1-hexene, 4-methyl-1-pentene, and 3-methyl-1-butene (examples of dienes which are more commonly present in the above mentioned elastomeric copolymers are butadiene, ethylidene-norbornene and 1,4-hexadiene);
5) heterophasic polymers obtained by way of sequential polymerization, made up of (A) a homopolymer fraction of the propylene, or one of the copolymers of paragraph (3) and a copolymer fraction (B) made up of elastomeric copolymers of paragraph (4).

Other examples of polymers for which the compounds object of the present invention have proven effective as light stabilizers are the following:
diolefin or cycloolefin polymers, such as for example polyisoprene, polybutadiene, polycyclopentene, polynorbornene and their mixtures, or their copolymers or terpolymers;
copolymers of mono- and diolefins with other vinyl comonomers, such as for example ethylene-alkyl/-methacrylates and ethylene-vinyl acetates;
polystyrene or polymethylstyrene, and copolymers of styrene or methylstyrene with other dienes or acrylic derivatives, such as for example styrene-butadiene and styrene-acrylonitrile copolymers, and corresponding terpolymers, such as for example styrene-butadiene-methacrylate terpolymers; mixtures between styrene copolymers and other polymers such as polyacrylates, for example; block copolymers containing styrene, such as styrene-ethylene-propylene-styrene, or styrene-butadiene-styrene, for example;
polymers obtained by grafting styrene by itself or in combination with another acrylic monomer on unsaturated polymers, such as, for example, styrene grafted on polybutadiene, or styrene and alkylacrylates grafted on polybutadiene, or styrene and acrylonitrile grafted on ethylene-propylene-diene terpolymers, and mixtures of said polymers with the ones described above;
polymers containing halogen atoms, such as for example polychloroprene and chlorinated rubbers, or homopolymers and copolymers of epichlorohydrin or polyvinylidene fluoride, or copolymers of halogenated monomers, such as for example vinyl chloride-vinyl acetate copolymers;
polymers obtained from unsaturated α-βacids, or their derivatives, such as for example polyacrylates, or polyacrylamides, or polyacrylonitrile; their copolymers with the monomers mentioned above, such as for example acrylonitrile-butadiene, or acrylonitrile vinyl-halide copolymers;
polymers obtained from amines and unsaturated alcohols, or their acyl or acetal derivatives, such as for example, the polyvinyl acetate or maleate;
homopolymers and copolymers obtained from cyclic ethers such as, for example, the polyethylene oxide;
polyacetals such as polyoxymethylene, and copolymers with ethylene oxide;
polyphenyl oxide and its mixtures with polystyrene;
polyurethanes, polyamides, and copolyamides, such as, for example, the polyamide 6,6 or 6,10, and their copolymers with polyethers;
polyureas, polyimides, and polyamide-imides;
polyesters such as, for example, polyethyelene terephtalate, and polycarbonates;
polyetheroketones and polyheterosulfones and polysulfones;
cross-linked polymers, such as for example the phenolformaldehyde resins, or melamine-formaldehyde, or unsaturated polyesters with a vinyl compound as cross-linking agent; thermosetting acrylic resins, such as those derived from epoxyacrilates;
any mixture of the polymer classes mentioned above; and
natural polymers such as rubber, or cellulose with its chemical modifications.

Other organic materials to which the compounds object of the present invention can be added in order to promote light stabilization are: mineral, vegetable or animal oils and their mixtures, e.g. with paraffin waxes, or mixtures of synthetic esters with mineral oils, such as the ones used as plastifiers for polymers; synthetic or natural rubber aqueous emulsions.

The stabilizers which are the object of the present invention can be easily incorporated in the polymers by using conventional techniques at any stage of production which precedes the manufacture of the final article. The stabilizer can be mixed with the polymer by using various techniques, such as dry mixing in powder form, or wet mixing in solutions, suspensions, or even as masterbatch. In these operations the polymer can be used in powder, pellet, solution, suspension or latex form.

The compounds which are the object of the present invention can be used together with other conventional additives for polymers, such as anti-oxidants, stabilizers with a Ni base, pigments, reinforcing agents, plasticizers, anti-acids, antistatic agents, flame retardants, lubricants, corrosion inhibitors, metal complexing agents, peroxide scavengers, other basic co-stabilizers and nucleating agents. In particular, examples of antioxidants which can be used together with the compounds of the present invention are:

alkylated monophenols, such as for example 2,6-di-tert-butyl-4-methylphenol, 2-tert-butyl-4, 6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(α-methylcycloexyl)-4,6-dimethylphenol, 2,6-octadecyl-4-methylphenol, 2,4,6,-tricyclohexylphenol, 2,6-di-tert-butyl-4-methoxymethylphenol, and 2,6-di-nonyl-4-methylphenol;

alkylated hydroquinones, such for example 2,6-di-tert-butyl-4-methoxyphenol, 2,5-di-tert-butylhydroquinone, 2,5-di-tert-amylhydroquinone, and 2,6-di-phenyl-4-octadecyloxyphenol.

hydroxylated thiodiphenyl ethers, such as for example 2,2'-thiobis(6-tert-butyl-4-methyphenol), 2,2'-thiobis(4-octylphenol), 4,4'-thiobis-(6-tert-butyl-3-methylphenol;

alkylidenebisphenols, such as for example 2,2'-methylenebis(6-tert-butyl-4-methylphenol), 2,2'-methylenebis (6-tert-butyl-4-ethylphenol), 2,2'methylenebis(4-methyl-6-(α-methylcyclohexyl)phenol], 2,2'-methylenebis(4-methyl-6-cyclohexylphenol), 2,2'methylenebis(6-nonyl-4-methyphenol), 2,2'methylenebis(4,6-di-tert-butylphenol), 2,2'-ethylidenebis(4,6-di-ter-butylphenol), 2,2'ethylidenebis(6-tert-butyl-4-isobutylphenol), 2,2'-methylenebis[6-(α-methylbenzyl)-4-nonylphenol], 2,2'-methylenebis[6(α,α-dimethylbenzyl)-4-nonylphenol], 4,4'-methylenebis (2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl-3-n-dodecylmercaptobutane, ethylene glycol bis-(3,3-bis(3'-tert-butyl-4'hydroxyphenyl)butyrate, bis(3-tert-butyl-4-hydroxy-5-methylphenyl)dicyclopentadiene and bis[2-(3'-tert-butyl-2'-hydroxy-5'-methylbenzyl)-6-tert-butyl-4-methylphenyl]terephthalate;

benzyl compounds, such as for example 1,3,5-tris(3,5-di-tert-butyl-4-hydroxybenzyl)-2-4,6-trimethylbenzene, bis(3,5-di-tert-butyl-4-hydroxybenzyl) sulfide, isooctyl 3,5-di-tert-butyl-4-hydroxybenzyl mercaptoacetate, bis(4-tert-butyl-3-hydroxy-2,6-dimethylbenzyl)dithiolterephtalate, 1,3,5-tris(3,5-di-tert-butyl-4-hydroxybenzyl)isocyanurate,1,3,5-tris (4-tert-butyl-3-hydroxy-2,6-dimethylbenzyl) isocyanurate, dioctadecyl 3,5-di-tert-butyl-4-hydroxybenzylphosphonate, calcium salt of monoethyl 3,5-di-tert-butyl-4-hydroxybenzylphosphonate and 1,3,5-tris(3,5-dicyclohexyl-4-hydroxybenzyl)isocyanurate;

acylaminophenols, such as for example 4-hydroxyanilide of lauric acid, 4-hydroxyanilide of stearic acid, 2,4-bis(octylmercapto)-6-(3,5-di-tert-butyl-4-hydroxyaniline)-s-triazine, octyl N-(3,5-di-tert-butyl-4-hydroxyphenyl)carbamate.

esters of β-(3,5-di-tert-butyl-4-hydroxyphenyl)-propanoic acid with alcohols containing one or more hydroxy groups, for example methanol, diethylene glycol, octadecanol, triethylene glycol, 1,6-hexanediol, pentaerythritol, neopentyl glycol tris (hydroxyethyl) isocyanurate, thiodiethylene glycol, and the N,N'-bis(-hydroxyethyl)diamide of oxalic acid;

esters of β-(5-tert-butyl-4-hydroxy-3-methylphenyl)-propanoic with alcohols containing one or more hydroxy groups, such as for example methanol, dietylene glycol, octadecanol, triethylene glycol, 1,6-hexanediol, pentaerithritol, neopentyl glycol, tris (hydroxyethyl) isocyanurate, thiodiethylene glycol, and the N,N'-bis(-hydroxyethyl)diamide of oxalic acid;

esters of β-(3,5-dicyclohexyl-4-hydroxyphenyl) propanoic acid with alcohols containing one or more hydroxyl groups, such as for example methanol, diethylene glycol, octadecanol, triethylene glycol, 1,6-hexanediol, pentaerithrytol, neopentyl glycol, tris (hydroxyethyl)isocyanurate, thiodiethylene glycol, and N,N'-bis(hydroxyethyl)diamide of oxalic acid;

amides of β-(3,5-di-tert-butyl-4-hydroxyphenyl) propanoic acid, such as for example, N,N'-bis(3,5-di-tert-butyl-4-hydroxyphenylpropionyl)hexamethylenediamine, N,N'-bis(3,5-ditert-butyl-4-hydroxyphenylpropionyl)trimethylenediamine, and N,N'-bis(3,5-di-tert-butyl-4-hydroxyphenylpropionyl)hydrazine.

Examples of complexing agents are: N,N'-diphenyldiamide of oxalic acid, N-salycylal-N'-salicyloilhydrazide, N,N'-bis(salicyloil)hydrazine, N,N'-bis(3,5-di-tert-butyl-4-hydroxyphenylpropionyl)hydrazine, 3-salicyloilamino-1,2,4-triazol,bis-(benzylidene)dihydrazide of oxalic acid.

Examples of phosphites and phosphonites are: triphenyl phosphite, diphenylalkyl phosphites, phenyldialkyl phosphites, tris(nonylphenyl)phosphite, trialauryl phosphite, distearyl pentaerythritol diphosphite, tris(2,4-di-tert-butylphenyl)phosphite, diisodecyl pentaerythritol diphosphite, bis(2,4-di-tert-butylphenyl)penterythritol diphosphite, tristearyl sorbitol triphosphite, tetrakis(2,4-di-tert-butylphenyl)-4,4'-biphenylene diphosphonite, and 3,9-bis(2,4-di-tert-butylphenoxy)-2,4,8,10-tetraoxa-3,9-diphosphaspiro[5,5]undecane.

Examples of scavengers of peroxide are: esters of β-thiodipropionic acid, for example laurylic, stearilic, myristilic, or tridecylic ester, mercaptobenzoimidazole, or the zinc salt of 2-mercaptobenzoimidazole, zinc dibutyldithiocarbamate, dioctadecyl disulfide, and pentaerythritol tetrakis(β-dodecylmercapto)propionate.

Examples of compounds used as basic co-stabilizers are: melamine, polyvinylpyrrolidone, dicyandiamide, triallyl cianurate, urea derivatives, hydrazine derivatives, amines, polyamides, polyurethanes, alkaline and alkaline-earth metal salts of higher fatty acids, for example Ca, Zn and Mg stearate, Na ricinoleate, K palmitate, and Sb or Zn pyrocatecholate.

Examples of nucleating agents are: 4-tert-butyl-benzoic acid, adipic acid and diphenyl acetic acid.

Examples of reinforcing agents are: calcium carbonate, silicates, glass fibers, amianthus, talc, kaolin, mica, metal oxides and hydroxides, barium sulfate, carbon black and graphite.

The following examples are given in order to illustrate and not limit the present invention:

EXAMPLE A

Preparation of Polypropylene Containing Aldehyde Groups

In a four necks 250 ml flask, equipped with mechanical agitator, cooling device, thermometer, and nitrogen flow tube, are introduced 30 g of polypropylene with a vinylidene terminal group, with a molecular weight of about 500, containing one double bond per chain, and prepared by polymerization in homogeneous phase with di-cyclopentadienyl zirconium dichloride and polymethylalumoxane, 8,6 ml of an aqueous solution at 35% (weight/vol.) of hydrogen peroxide, 15 ml of a dichloroethane solution containing 1.17 mmoles of $[(C_8H_{17})_3 N(CH_3)]_3 PW_4O_{24}$, and 90 ml of dichloroethane.

The mixture is maintained at reflux temperature for 6 hours while under agitation.

At the end, 900 ml of ethyl ether are added. The phases are allowed to separate, and the organic layer is washed with water.

The organic solution is dried with sodium sulfate, and then passed through a column containing "Florisil TM" (magnesium silicate) in order to eliminate the catalyst completely.

After evaporating the solvent, 28.4 g of viscous oil are obtained having an epoxide content of 1.45 mmoles/g.

The NMR analysis of the epoxidized polymers shows an almost total conversion of the olefin in the case one starts with polymers with a vinylidene terminal group.

In the same apparatus that was previously described are introduced 130 ml of anhydrous benzene, 8.8 g of $BF_3.Et_2O$ and g 40.4 of epoxidized polypropylene, prepared from polypropylene with a vinylidene terminal group, having a molecular weight of about 500 and an epoxide content of 1.45 mmoles/g.

The solution is stirred at ambient temperature for 16 hours. At the end, the reaction mixture is poured in $H_2O$ and extracted with ether. The ethereous extract is washed with $H_2O$ until the wash waters are completely neutral. After evaporating the ether, 40.2 g of product in the form of yellow oil are obtained.

The presence of an aldehyde group on this compound is recognized by the IR (1730 cm$^{-1}$) and NMR spectrum ($\delta=9.70$) in $CDCl_3$.

EXAMPLE 1

In the same apparatus described in Example A, the polymer containing aldehyde groups is added with 130 ml of toluene and 10 g of 4-amino-2,2,6,6-tetramethylpiperidine.

The mixture is heated at reflux for 18 hours, and water is removed by azeotropic distillation.

The toluene is evaporated, and 10 g of $NaBH_4$, 120 ml of ether and 60 ml of ethanole are added to the residue.

The suspension is stirred at ambient temperature for 16 hours. At the end, the mixture is filtered, and the solution washed with $H_2O$ and evaporated.

A residue of 44.5, having a nitrogen content of 2.0% (theoretical, calculated based on the epoxide content: 3.33%), and containing no free 4-amino-2,2,6,6-tetramethylpiperidine, as per gas-chromatographic analysis, is isolated. The presence of the desired product has been confirmed by the NMR analysis.

The compound obtained has the formula:

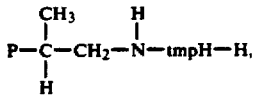

where P, in this case, indicates the polypropylene chain. This compound can be referred to the formula of $P(ZA)_n$, where n is 1 and the ZA group has the (c) structure where: t is O, $R_1$ is $CH_3$, Q is H, g is 1 and $A^{II}$ has the (6) structure where $R_2$ and $R_3$ are both H.

EXAMPLE 2

In a 100 ml flask provided with a magnetic agitator, and a "Diean-Stark trap" for the azeotropic distillation of $H_2O$, are added 5.86 g of polypropylene containing the aldehyde group prepared following the same method described in Example A (8.5 milliequivalents), 2.9 g of N,N'-bis(2,2,6,6-tetramethyl-4-piperidinyl)ethylene diamine (85 mmoles) and 40 ml of xylene. The mixture is heated at reflux for 24 hours, and water is separated by distilling the azeotrope with xylene. A the end, the xylene is evaporated in vacuum and the nonreacted N',N'-bis(2,2,6,6-tetramethyl-4-piperidinyl)ethylene diamine is removed by sublimation at 100°-110° C., at a pressure of 0.1 mmHg.

The NMR analysis confirms the formation of the imidazole ring and disappearance of the aldehyde function.

The gas-chromatographic analysis indicates the complete disappearance of the initial diamine.

An elementary analysis shows that the product has a nitrogen content of 4.53% (theoretical 5.04%, calculated according to the aldehyde content).

The synthetized compound has the formula:

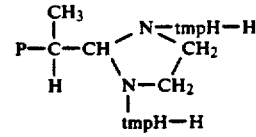

where P, in this case, indicates the polypropylene chain having a molecular weight of about 500. This compound can be referred to the general formula $P(ZA)_n$, where n is 1 and the ZA group has the (i) structure, where: t is 0, $R_1$ is $CH_3$, Q is H and $A^{III}$ has the (7) structure, where i is 2 and $R_2$ is H.

EXAMPLE 3

2 kg of Moplen FL S 20 polypropylene, produced by Himont, appropriately stabilized with an Irganox 1010/Irganox 1076/Sandostab P-EPQ mixture, are admixed with the oligomeric stabilizer of Example 1 (sample 1).

For comparison purposes other two samples A and B are prepared by adding respectively Tinuvin 770 and Chimassorb 944 (commercial UV stabilizers) to the same amount of polypropylene.

The three mixtures (samples 1, A and B) contain an amount of stabilizer equivalent to 3500 ppm of Tinuvin 770. Using said samples films are prepared 5 cm wide and 50μ thick, from which test pieces 3 cm wide are obtained. Said samples are introduced in a weather-o-meter Ci 65 (Atlas), utilizing a 6500 Watt xenon lamp with quarz-borisilicate filter (>275 nm), having the following radiance: at 340 nm 0.5 W/m$^2$; from 250 to 300 nm 1 W/m$^2$; from 300 to 400 nm 55 W/m$^2$ and 400 to 800 nm 463 W/m$^2$.

The temperature of the black panel was 65° C. and the temperature of the chamber 42° C. The relative humidity of the dry cycle was 50%. The duration of the dry cycle was 102 minutes. The duration of the rain cycle was 18 minutes. Using said samples yield at break and the elongation at break were measured after 300, 500 and 750 hours. The data are reported in the following table.

TABLE

| Sample 1 | | Sample A | | Sample B | |
|---|---|---|---|---|---|
| C.R. (300 h) 94% | A.R (300 h) 97% | C.R. (500 h) 96% | A.R(300 h) 99% | C.R.(500 h) 98% | A.R(300 h) 98% |
| C.R. (500 h) 92% | A.R (500 h) 95% | C.R. (500 h) 50% | A.R(500 h) 50% | C.R.(500 h) 94% | A.R(500 h) 96% |
| C.R. (750 h) 78 | A.R. (750 h) 84 | C.R. (750 h) — | A.R(750 h) — | C.R.(750 h) 85 | A.R(750 h) 90 |

Other features, advantages and embodiments of the invention disclosed herein will be readily apparent to those exercising ordinary skill after reading the foregoing disclosure.

In this regard, while specific embodiments of the invention have been described in considerable detail, variations and modifications of these embodiments can be effected without departing from the spiriti and scope of the invention as described and claimed.

We claim:

1. Polymer compounds containing sterically hindered amino groups, suitable to be used as stabilizers, having the general formula:

$$P(ZA)_n$$

where:

P is a polymer chain deriving from a polymer selected from: polymers or copolymers of olefins having a terminal double bond and from 2 to 10 carbon atoms, or polymers of conjugated di-olefins having 4 or 5 carbon atoms, or their copolymers with the olefins defined above;

n is a number from 1 to 20; and the ZA groups, equal or different, directly bonded to the polymer chain, can be present in the terminal position, inserted in the polymer chain or in one of its branches, and are selected from the group consisting of:

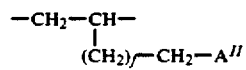  a)

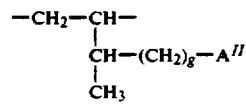  b)

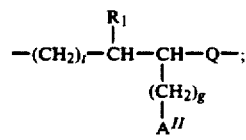  c)

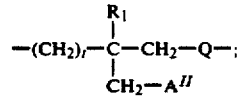  d)

where:

f is 1 or 2;

g is 0 or 1;

t is 0 or 1;

$R_1$ is selected from H or a $C_1$-$C_8$ alkyl or phenyl radical;

Q is H or —$(CH_2)_t$— depending on whether the ZA group is terminal, inside the chain or lateral; and $A^{II}$ is a radical containing the structure of a polyalkyl piperidine, always bonded to the carbon of the polymer chain through an N atom;

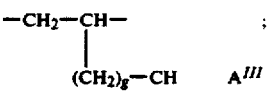  e)

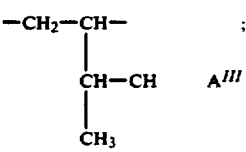  f)

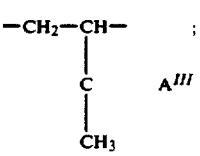  g)

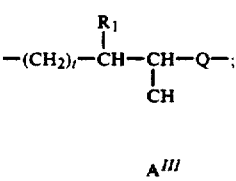  h)

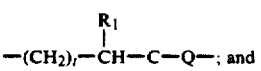  i)

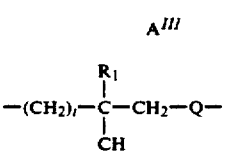  l)

where: $A^{III}$ is a bivalent radical, containing the structure of a polyalkyl piperidine and it forms a cyclic structure with the carbon atom of the polymer chain to which it is bonded, since it is bonded to this carbon through two N or O atoms, or it forms a double bond with the carbon atom of the polymer chain to which it is bonded.

2. Compounds as per claim 1, where $A^{II}$ is selected from:

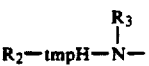  1)

where:

$R_2$ is selected from H, the $CH_2$—CN radical, a $C_1$-$C_{12}$ alkyl radical, $C_3$-$C_{12}$ alkenyl, an acyl radical of formula CO—$R_2'$, where $R_2'$ is a $C_1$-$C_{12}$ alkyl radical, or a $C_7$-$C_{12}$ aralkyl radical optionally substituted with alkyl or alkoxy groups;

$R_3$ is selected from H, a $C_1$-$C_{18}$ alkyl radical, a $C_5$-$C_8$ cycloalkyl radical, a $C_2$-$C_{12}$ alcoxyalkyl, a dialkylamino alkyl having up to 10 carbon atoms or the —tmpH—R$_2$ group; and tmpH indicates the group

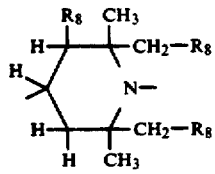

with R$_2$ always bonded to the piperidine nitrogen atom; where R$_8$ is H or CH$_3$;

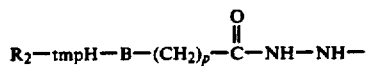

where: B is selected from O and NR$_3$ and p is an integer from 1 to 4;

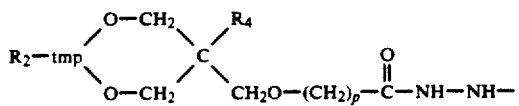

where R$_4$ is a C$_1$-C$_6$ alkyl radical and tmp indicates the group:

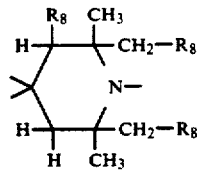

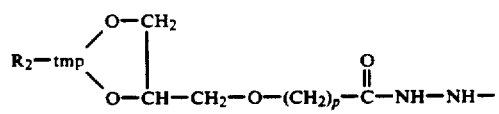

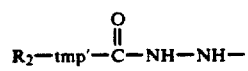

where tmp' has the structure

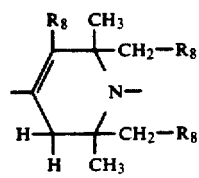

with R$_2$ always bonded to the piperidine nitrogen atom;

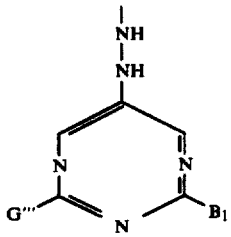

where G''' is selected from the (1) structure or the following structures:

R$_2$—tmpH—O—,      1a)

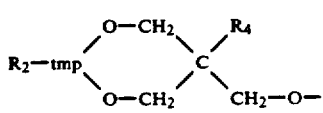

where R$_4$ is a C$_1$-C$_6$ alkyl radical,

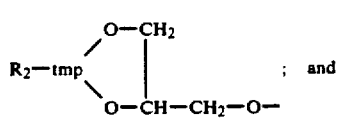

B$_1$ has the same meaning as G''', or is a D—R$_5$, where D is selected from O,S,NH,NR$_7$, R$_7$ is H, a C$_1$-C$_3$ alkyl, a benzyl, or allyl radical, a (CO)R$_9$ radical, where R$_9$ is a C$_1$-C$_6$ alkyl, C$_2$-C$_6$ alkenyl, C$_2$-C$_6$ alkynyl, C$_6$-C$_{10}$ aryl, C$_7$-C$_{13}$ aralkyl radical, or a Si(R'$_9$)$_3$ radical where R'$_9$ is a C$_1$-C$_4$ alkyl or a phenyl radical, and where R$_5$ is a C$_1$-C$_{20}$ alkyl radical, a C$_5$-C$_8$ cycloalkyl radical, a C$_7$-C$_{12}$ aralkyl radical, or C$_6$-C$_{12}$ aryl radical.

3. Compounds of claim 1, where A$^{III}$, in the case it forms a cyclic structure with the carbon atom of the polymer chain to which it is bonded, is selected from:

where i is 2 or 3;

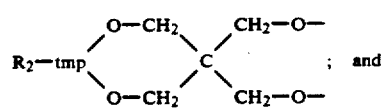

where R$_6$ is H or CH$_3$;
in the case it forms a double bond with the carbon atom to which it is bonded, A$^{III}$ has the structure:

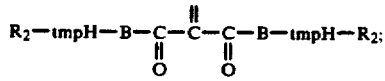

4. Compounds of claim 1, where the polymer chain (P) is selected from polyethylene, polypropylene, polybutene, polybutadiene and their copolymers and has a molecular weight from 200 to 10,000.

5. Compounds of claim 1, where the polyalkyl piperidine is 2,2,6,6-tetramethylpiperidine.

6. Polymer compositions comprising the stabilizing compounds defined in claim 1.

7. Polymer compositions of claim 6 comprising from 0.01 up to 3 parts by weight of stabilizing compounds per 100 parts by weight of polymer material to be stabilized.

8. Polymer compositions of claim 6, where the polymer material to be stabilized comprises one or more polymers or copolymers, or their mixtures, obtained by way of sequential polymerization of olefins of formula $R'''-CH=CH_2$, where $R'''$ is a hydrogen atom, or a 1–6 carbon alkyl or an aryl radical.

* * * * *

UNITED STATES PATENT AND TRADEMARK OFFICE
CERTIFICATE OF CORRECTION

PATENT NO. : 5,300,583
DATED : April 5, 1994
INVENTOR(S) : Marco Foa' et al

It is certified that error appears in the above-identified patent and that said Letters Patent is hereby corrected as shown below:

At col. 3, lines 36-38, change the formula from:

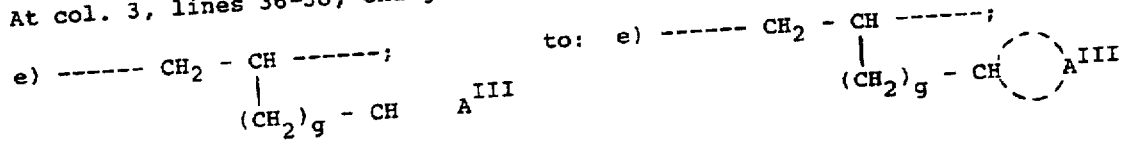

At col. 3, lines 42-46, change the formula from:

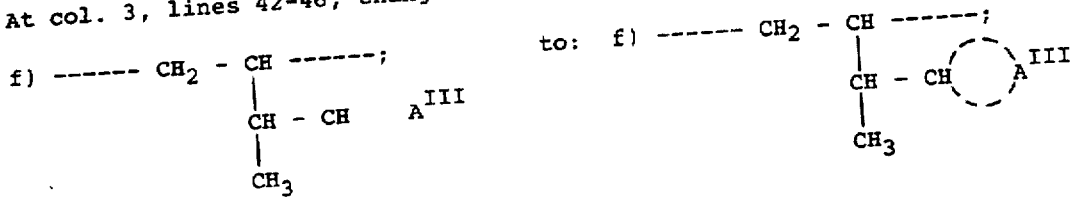

At col. 3, lines 48-52, change the formula from:

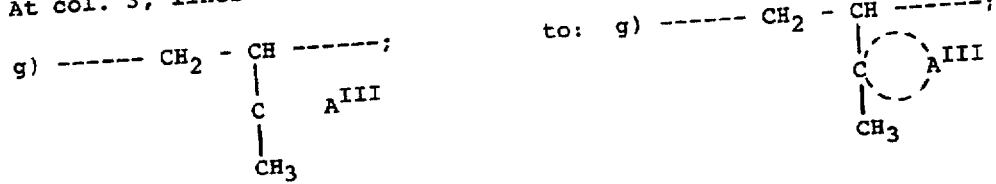

At col. 3, lines 55-61, change the formula from:

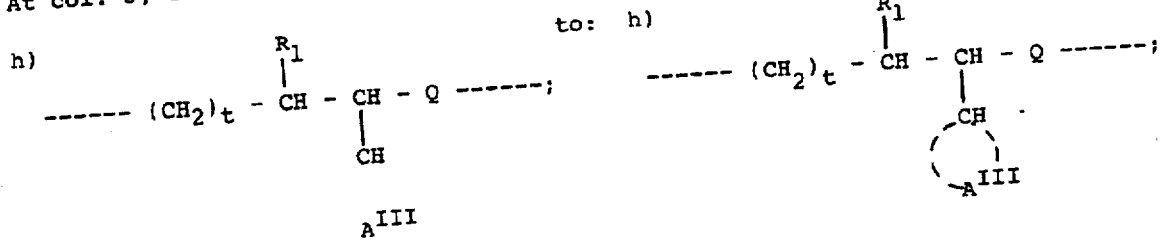

UNITED STATES PATENT AND TRADEMARK OFFICE
CERTIFICATE OF CORRECTION

PATENT NO. : 5,300,583

DATED : April 5, 1994

INVENTOR(S) : Marco Foa' et al

It is certified that error appears in the above-identified patent and that said Letters Patent is hereby corrected as shown below:

At col. 3, lines 63-67, change the formula from:

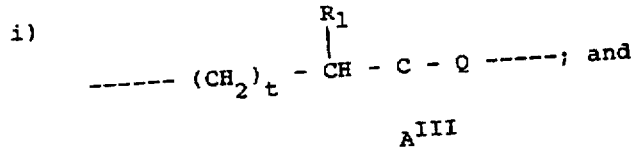

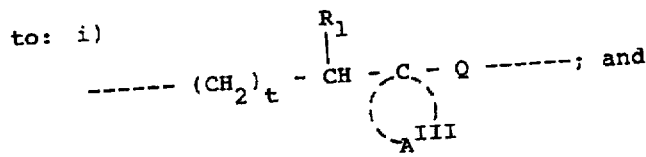

At col. 4, lines 1-8, change the formula from:

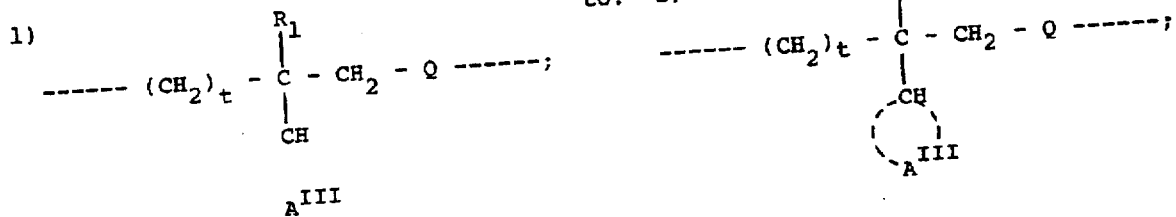

At col. 16, lines 8-10, change the formula from:

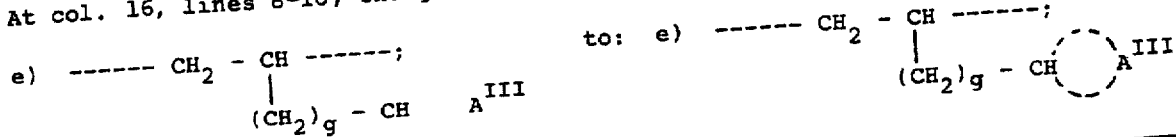

UNITED STATES PATENT AND TRADEMARK OFFICE
CERTIFICATE OF CORRECTION

PATENT NO. : 5,300,583
DATED : April 5, 1994
INVENTOR(S) : Marco Foa' et al

It is certified that error appears in the above-identified patent and that said Letters Patent is hereby corrected as shown below:

At col. 16, lines 13-17, change the formula from:

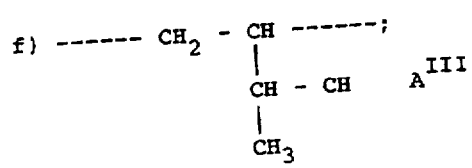         to:  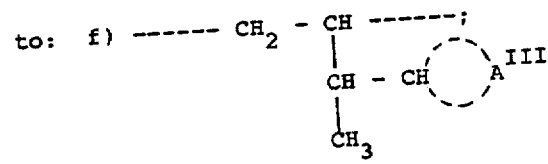

At col. 16, lines 19-23, change the formula from:

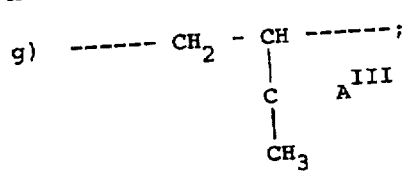         to:  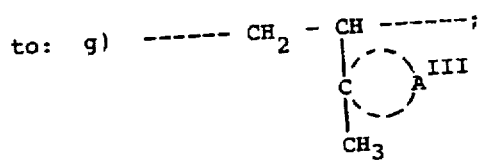

At col. 16, lines 25-31, change the formula from:

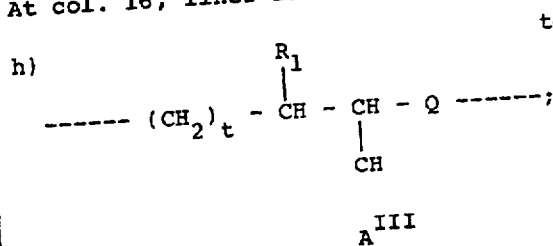         to:  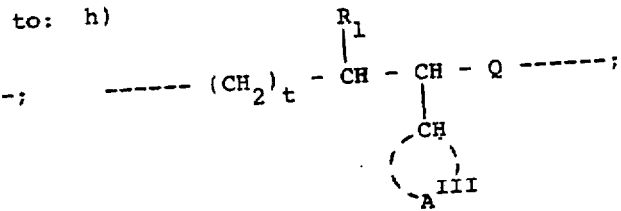

UNITED STATES PATENT AND TRADEMARK OFFICE
CERTIFICATE OF CORRECTION

PATENT NO. : 5,300,583
DATED : April 5, 1994
INVENTOR(S) : Marco Foa' et al

It is certified that error appears in the above-identified patent and that said Letters Patent is hereby corrected as shown below:

At col. 16, lines 33-37, change the formula from:

i) 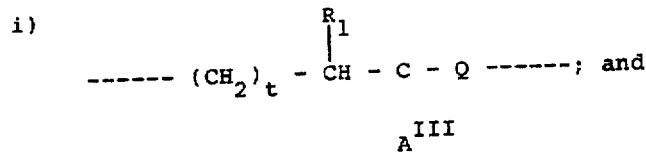

to: i) 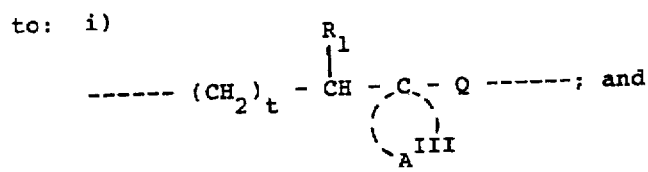

UNITED STATES PATENT AND TRADEMARK OFFICE
CERTIFICATE OF CORRECTION

PATENT NO. : 5,300,583
DATED : April 5, 1994
INVENTOR(S) : Marco Foa', et al.

It is certified that error appears in the above-indentified patent and that said Letters Patent is hereby corrected as shown below:

At col. 16, lines 38-45, change the formula from:

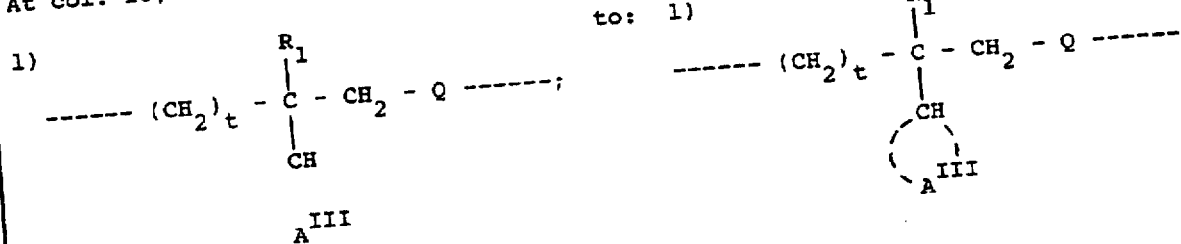

Signed and Sealed this

Thirtieth Day of August, 1994

Attest:

BRUCE LEHMAN

Attesting Officer

Commissioner of Patents and Trademarks